UNITED STATES PATENT OFFICE.

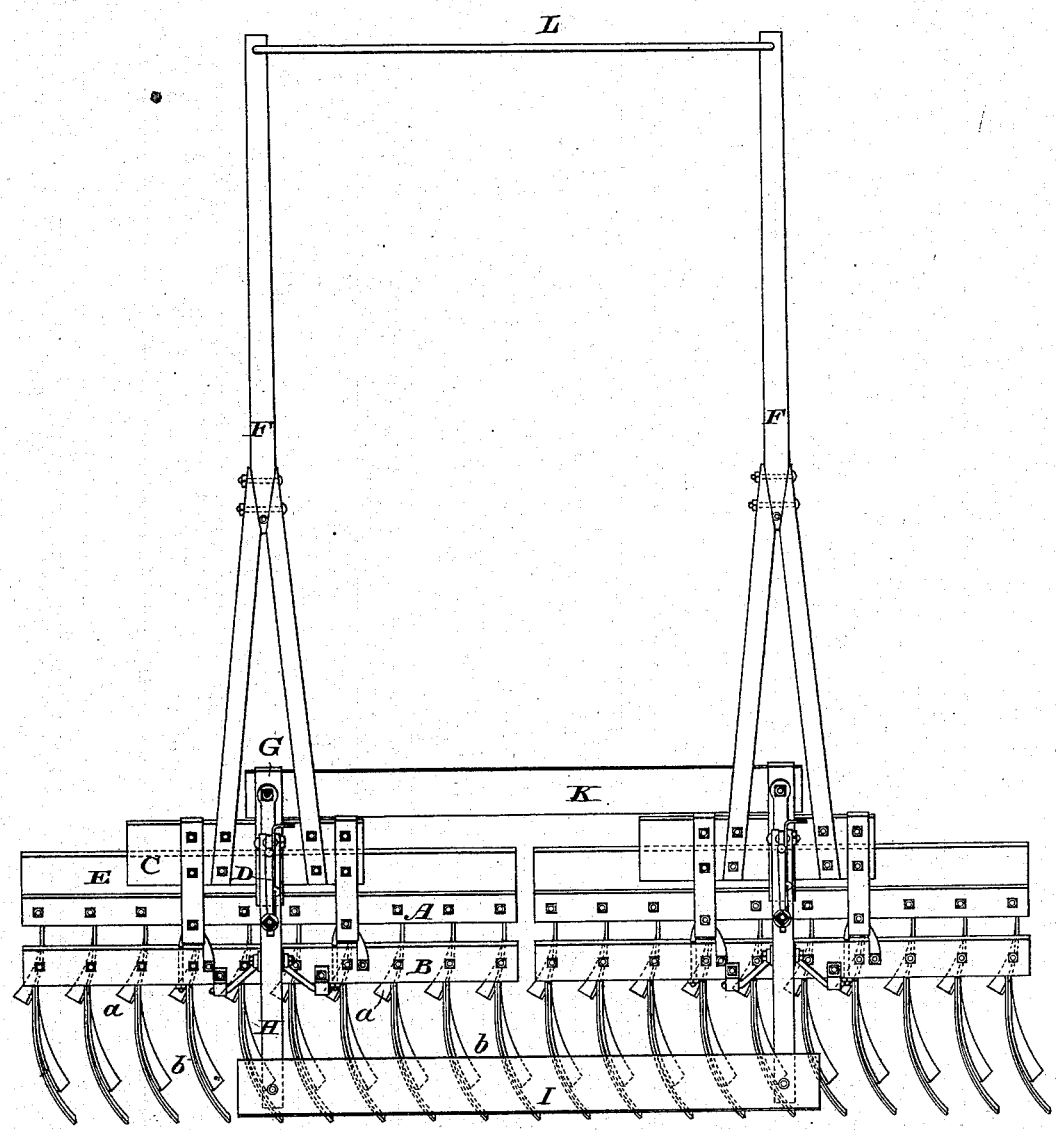

FREDERICK NISHWITZ, OF MILLINGTON, NEW JERSEY.

AGRICULTURAL MACHINE.

SPECIFICATION forming part of Letters Patent No. 288,657, dated November 20, 1883.

Application filed January 23, 1882. (No model.)

*To all whom it may concern:*

Be it known that I, FREDERICK NISHWITZ, of Millington, in the county of Morris and State of New Jersey, have invented an Improvement in Agricultural Machines, of which the following is a specification.

In seeding, harrowing, or operating upon soil to prepare it for seeding it is very desirable and important, in economizing labor and time, to treat as wide a swath or strip of soil as possible in one traverse of the machine over the field. This is more especially so where large areas are to be operated upon, as in our northern and western country, where fields of grain of vast extent are grown, where labor is scarce and the season short. To meet this urgent demand in machines having poles where the operating-implements are arranged in a gang transverse to the draft-line, they have been made of extra or double size, designed to operate upon a strip of soil twelve or fourteen feet, or more, in width, the usual width of the ordinary-size machines being about six or seven feet. Such a double-size machine, however, has been found to do bad work, and to be impractical and unwieldy in the field. The reason of this is that it is of such a width that it will not travel in a straight line, the leverage from the side or end of the machine to the point of draft causing it to swing and move very irregularly in its passage over the field, and when one end meets a material obstruction the leverage is so great that the machine is thrown round by the draft of the team, thus marring the work being done, straining the machine, and worrying and tiring the team. These objections apply specially to machines—such as harrows and seed-drills—where the harrowing and seeding devices are mounted in a gang or gangs upon a bar or bars arranged transversely to the pole or the line of draft. It is inexpedient and impractical to make machines of this class of extra width, as above mentioned, for the reasons given. There are also further objections. The machines do not so well follow the undulations and irregularities of the surface, their excessive width causing them to bridge over depressions and hold the earth-treating implements or devices out of contact with the ground, thus very imperfectly operating upon the surface traversed, and the widening of the machine involves the use of heavier timbers, thus increasing cost and labor of production, and unduly adding to the weight of the machine in proportion to its width.

The object of my invention is to produce an agricultural machine of the character last mentioned, (*i. e.*, having transverse frames and poles,) and of the desired width, which will be free from the objections above recited, and which will require but one attendant or driver.

To this end the invention consists in joining two such fully-organized machines having narrow transverse frames and poles side by side by pivotal connections or parallel coupling-bars, which will permit each machine to rock transversely independently of the other, and to move forward and back, within certain limits, independently of the other, each machine having its own draft-connection and pole, so that it is drawn by its own team, and moves in limits freely over the ground independently of its mate.

In the accompanying drawing, which is a plan view of my improved organization, I have shown two harrows joined together, each having a pole or tongue.

The particular form of harrow shown consists of two parallel cross gang-bars, A B, one in front of the other, carrying curved harrow-teeth *a b*. The teeth on each bar are curved in reverse directions, so as to cause the machine to move in a straight line, as is well understood.

The bars A B are each hinged to a coupling-frame, C, and are capable of being rocked on their hinges, to vary the relation of the teeth to the ground, by a lever, D, pivoted on the frame C. The forward bar, A, carries an upwardly-inclined or bevel-faced leveler or crusher-bar, E, the relation of which to the ground is varied by the rocking of the bar above mentioned.

The pole or tongue F is rigidly connected with the coupling-frame, as is also the draft-stub or short bar G. The seat-standard H is mounted on the frame, and inclines backwardly over the gang-bars.

It is deemed unnecessary to more fully describe this or any other form of machine, the above description and the drawing being sufficient to clearly show the characteristics necessary to be appreciated for the purposes of this invention.

My present invention is not limited to any special kind of harrow, or to a harrow, broadly, as other machines of the character referred to at the beginning of this specification may be similarly organized. The harrow shown in my Patent No. 225,634, of March 16, 1880, is well adapted for this organization. The two machines are complete in all respects, except that the seats are removed to give place to a coupling-plank, I, which is pivoted on the end of each seat-standard, and serves as a seat for the single driver, who controls both machines. A similar coupling bar or plank, K, is pivoted on the under side of the draft-stubs, being held by the same bolt that holds the whiffletree. A third coupling-rod, L, the bent ends of which pivot in holes in the ends of the tongues, also connects the machines.

It will be seen that the machines are joined by a parallel motion, and that a space is left between the opposite ends of the gang-bars of the machines, so that either of them may move back and forth within limits independently of the other. Each machine is drawn by its own separate horse or team, and both are controlled by a single driver, who has both teams completely under his control. The coupling-rod connecting the ends of the tongues serves to maintain the parallelism of the machines, and to prevent the rupture of either of the tongues, should the team attached thereto move out of a right line relatively to the other machine. Sufficient play at the pivots of the parallel couplings is allowed to permit the machines to rock independently transversely to the line of draft to conform to undulations of the ground.

It will be perceived that the machines are each complete in themselves, and are capable of being uncoupled with ease for independent use.

By this organization a machine of the character shown, possessing the necessary flexibility and required width, is produced. I prefer the parallel-motion connection shown and described; but it is possible that other forms of coupling may be devised. For instance, a slide-joint consisting of a slotted bar and a headed bolt moving therein might be employed.

I am aware that a parallel cultivator in which the cultivating devices are arranged on longitudinal bars, and in which a double pole is employed, each half or section of the pole being attached to one of the cultivators, and the sections of the pole connected at their outer ends by a cross rod or bar, is old, and I therefore make no claim to any such organization.

I am also aware that, broadly, it is common to couple together two harrows or cultivators, so as to permit forward and back motion in limits.

I claim as my invention—

The combination of two agricultural machines, each having a transverse frame or gang-bar carrying earth-treating teeth or devices, a draft-connection, and a pole or tongue, the parallel coupling bars or planks pivotally connected with each machine, and the pivoted rod uniting the ends of the poles, substantially as and for the purpose set forth.

In testimony whereof I have hereunto subscribed my name this 18th day of January, 1882.

FREDERICK NISHWITZ.

Witnesses:
 JAMES R. RUNYON,
 JAMES A. BAKER.